United States Patent
Kim et al.

(10) Patent No.: US 8,274,942 B2
(45) Date of Patent: Sep. 25, 2012

(54) SUPPLEMENTARY SERVICE PROVISION METHOD AND SYSTEM FOR IMS-BASED NETWORK

(75) Inventors: Jun Hyung Kim, Suwon-si (KR); Jae Yeon Song, Seoul (KR); Sung Oh Hwang, Yongin-si (KR); Sung Jin Park, Hwaseong-si (KR); Se Hee Han, Seoul (KR); Je Young Maeng, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 277 days.

(21) Appl. No.: 12/699,478

(22) Filed: Feb. 3, 2010

(65) Prior Publication Data
US 2010/0195606 A1    Aug. 5, 2010

(30) Foreign Application Priority Data
Feb. 3, 2009 (KR) .................. 10-2009-0008252

(51) Int. Cl.
*H04W 72/04* (2009.01)
(52) U.S. Cl. ....................................... 370/329
(58) Field of Classification Search .............. 370/310, 370/328, 329, 351, 352, 389, 395.1, 395.2, 370/395.21
See application file for complete search history.

(56) References Cited

U.S. PATENT DOCUMENTS

| | | | |
|---|---|---|---|
| 7,672,317 B2* | 3/2010 | Gateva et al. | 370/401 |
| 7,673,053 B1* | 3/2010 | Foster et al. | 709/227 |
| 2006/0002308 A1 | 1/2006 | Na et al. | |
| 2006/0172754 A1* | 8/2006 | Shin et al. | 455/518 |
| 2006/0242307 A1 | 10/2006 | Jung et al. | |
| 2006/0268904 A1 | 11/2006 | Bae et al. | |
| 2007/0223491 A1* | 9/2007 | Baek et al. | 370/395.21 |
| 2008/0155659 A1* | 6/2008 | Gazier et al. | 726/4 |
| 2008/0256251 A1 | 10/2008 | Huotari et al. | |
| 2008/0307108 A1 | 12/2008 | Yan et al. | |
| 2009/0296688 A1* | 12/2009 | Bakker et al. | 370/352 |
| 2010/0107178 A1* | 4/2010 | Foster et al. | 719/316 |
| 2010/0112985 A1* | 5/2010 | Gavita et al. | 455/414.1 |
| 2011/0058520 A1* | 3/2011 | Keller et al. | 370/328 |
| 2011/0090904 A1* | 4/2011 | Zhao et al. | 370/352 |

* cited by examiner

*Primary Examiner* — Chi Pham
*Assistant Examiner* — Robert Lopata
(74) *Attorney, Agent, or Firm* — The Farrell Law Firm, P.C.

(57) ABSTRACT

A service provision method in an Internet Protocol Multimedia Subsystem (IMS) network is provided. A service request message is transmitted from a first user terminal to a second user terminal for requesting a service. The service request message includes global identifiers (IDs) allocated to the first user terminal and the second user terminal. A service response message is transmitted from the second user terminal to the first user terminal. A service session is established between the first user terminal and the second user terminal, when the service response message is received by the first user terminal.

12 Claims, 9 Drawing Sheets

FIG . 4

| HTTP header |
|---|
| HTTP Body<br>- Registration REQ/RSP<br>- User info. Retrieval REQ/RSP<br>- Service REQ/RSP |

FIG. 5

< HTTP message >

POST /test.cgi HTTP/1.1rn
User-Agent: Mozilla 4.0rn
Accept-type:
application/x-www-form-urlencode
Content-Length: (·)rn
Connection: Keep-Allvernrn"

- Message name: Resistration REQ
- Device Local ID 1:192.1.1.3
　　.UUID:6d02b8ec-bb17-4156-b3b3-
　　　　5369904c5fba
- Device Local ID 2:192.1.1.4
　　.UUID: 6d02b8ec-bd17-4156-b3b3
　　　　536990436cfb

< SIP message >

MESSAGE sip:IPTVapp@domain.com sip/2.0
Via: SIP/2.0/TCP user1pc.domain.come
Max-Forwards: 70
From: sip:userA@domain.com;tag=49583
TO: sip:IPTVapp@domain.com
Call-ID: asd88asd77a@1.2.3.4
CSeqL: 1 MESSAGE
Content-type: text/plan -Message type: Registration REQ
-Device global ID : ce1.user1@domain.com
　　-device info....
-Device global ID : ce9.user2@domain.com
　　-device info...

FIG. 6

< HTTP message >

GET /test.cgi HTTP/1.1rn
User-Agent: Mozilla 4.0rn
　　　Accept-Ranges: bytesrn
Content-Type application/x-www-form-urlencode
Content-Length: (·)rn
Connection: Keep-Alivernrn"

- Message name: Service REQ
- service type: File Share
- IMPU: userA@domain.com
- peer IMPUL: userB@domainc.om
- Device global ID: CEa.userA@domain.com
- Peer Device global: CEb.user@domain.com

< SIP message >

INVITE sip:userB@domain.com SIP/2.0
Via: SIP/2.0/TCP user1pc.domain.com
Max-Forwards: 70
From: sip:userA@domain.com;tag=49583
TO :sip:userB@domain.com
Call-ID:asd88asd77a@1.2.3.4
CSeq:1 MESSAGE
Content-Type:Application/SDP
Content-Length:18 v=0
o=mhandley 2890844526 2890842807
　　　IN IP4 126.16.64.4
s=Service Request
　i=File share, CEa,userA@domain.com,
　　　CEb.userB@domain.com
c=IN IP4 224.2.17.12/127
t= 0 0
m=File 2232 http 31

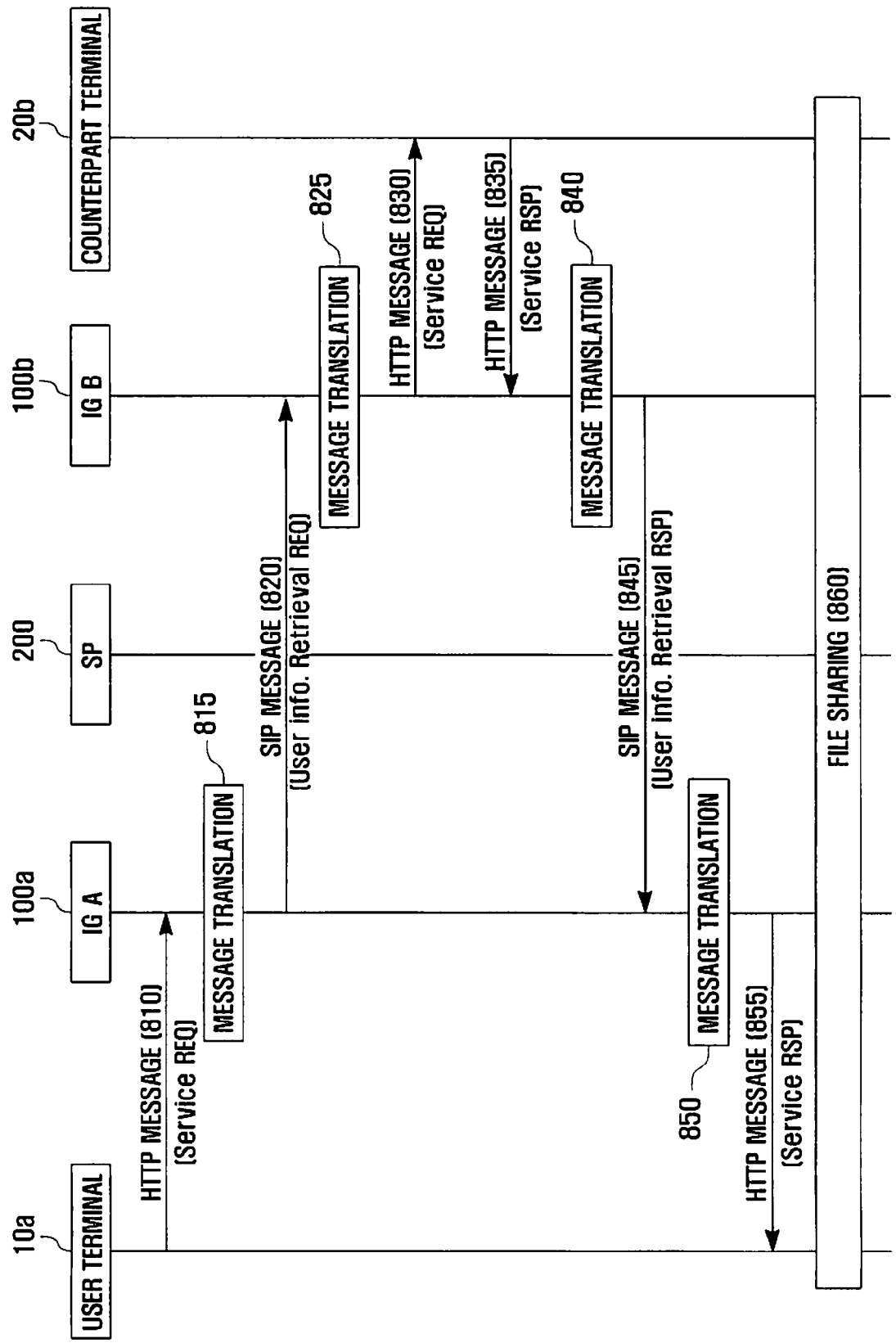

SUPPLEMENTARY SERVICE PROVISION METHOD AND SYSTEM FOR IMS-BASED NETWORK

This application claims priority to an application filed in the Korean Patent Office on Feb. 3, 2009 and assigned Serial No. 10-2009-0008252, the contents of which are hereby incorporated by reference.

BACKGROUND OF THE INVENTION

1. Field of the Invention

The present invention relates generally to Internet Protocol Television (IPTV) service based on an IP Multimedia Subsystem (IMS) and, more particularly, to a method and system for providing end user terminals with supplementary services in the IMS-based IPTV network.

2. Description of the Related Art

The IP-based convergence of communication and broadcast services is emerging as a new business model with promising marketability. As one of the best examples of this convergence, IPTV technology provides for various business models and services as well as a combination of conventional TV, voice, and information technologies.

The IPTV technology provides both fixed terminals (such as set-top boxes, Personal Computers (PCs), and Television sets) and mobile devices (such as mobile phones, Personal Digital Assistants (PDAs), and laptop computers) with flexible communication and broadcast services in any environment using wired, wireless, and broadcast networks, thereby also providing various business opportunities. An IPTV system architecture may be composed of various domains for providing end users with an IPTV service. These domains are described with reference to FIG. 1.

FIG. 1 is a diagram illustrating an IPTV service provision architecture that includes various domains within the IPTV value chain.

The IPTV value chain includes five domains: a consumer domain 1101, a network provider domain 1102, a platform provider domain 1103, an IPTV service provider domain 1104, and a content provider domain 1105.

The consumer domain 1101 is the domain in which the IPTV services are consumed. The consumer domain 1101 may consist of a single device or a network of devices (e.g., a home network). The devices may include mobile devices such as cellular phones and PDAs, as well as set-top boxes.

The network provider domain 1102 is the domain that connects the consumer to platform and service providers and is responsible for delivery of various types of services and content. The delivery system of the network provider domain 1102 is typically composed of access networks and core or backbone networks, using a variety of network technologies, such as wired and wireless access technologies and broadcast technologies.

The platform provider domain 1103 is the domain that provides common services (such as user authentication and charging) to IP service providers.

The IPTV service provider domain 1104 is the domain that provides IPTV services to the consumer domain 1101. The IPTV provider acquires/licenses content from the content providers and packages the content into a service.

The content provider domain 1105 is the domain that owns or is licensed to sell content or content assets.

In this five domain architecture, a variety of IPTV services, including scheduled content services and content on-demand services, can be supplied to the consumer equipment. Both examples of such services follow the content value chain having the following four roles: a content production unit 1109, a content aggregation unit 1108, a content delivery unit 1107, and a content reconstitution unit 1106.

The content production unit 1109 is placed in the content provider domain 1105 and is responsible for producing and editing the actual content.

The content aggregation unit 1108 is placed in the IPTV service provider domain 1104 and is responsible for bundling content into catalog offers and bouquets.

The content delivery unit 1107 is placed across the platform provider domain 1103 and the network provider domain 1102 and is responsible transporting the aggregated content to the consumer domain 1101.

The content reconstitution unit 1106 is placed in the consumer domain 1101 and is responsible for converting the content into a format suitable for rendering on an end-user device.

IP services can be categorized as a managed model or an unmanaged model (open Internet) depending on the Quality of Service (QoS). In the managed model, a service provider manages the platform provider domain 1103, the network provider domain 1102, and the IPTV service provider domain 1104. In the unmanaged model, the service provider is separated from the network provider. The service provider belongs to the IPTV service provider domain 1104, and the network provider domain 1102 and the platform provider domain 1103 are managed by different stakeholders.

Open IP TV Forum (OIPTVF) defines IPTV service and architecture and detailed technologies for providing the IPTV service, and deals with the managed network model based on the IMS. According to the OIPTVF, the IPTV service is provided through an IMS Gateway (IG) acting as an indoor IMS client.

As user requirements are diversified, needs exist for file sharing and communication between end user terminals using the IPTV service. Typically, current OIPTVF architecture supports a single IG as the IMS client. However, the conventional IMS-based IPTV system has a drawback in that, when multiple terminals are served by the IG, the IMS network does not identify the individual terminals attached to the IG. The terminals cannot communicate with each other based on the IPTV system.

SUMMARY OF THE INVENTION

The present invention has been made to address at least the above problems and/or disadvantages and to provide at least the advantages described below. Accordingly, an aspect of the present invention provides a supplementary service, provision method and system for an IMS-based IPTV network that is capable of extending the usability of the IMS-based network and creating a supplementary profit source.

According to one aspect of the present invention, a service provision method in an IMS network is provided. A service request message is transmitted from a first user terminal to a second user terminal for requesting a service. The service request message includes global identifiers (IDs) allocated to the first user terminal and the second user terminal. A service response message is transmitted from the second user terminal to the first user terminal. When the service response message is received by the first user terminal, a service session is established between the first user terminal and the second user terminals.

According to another aspect of the present invention, a service provision system using an Internet Protocol Multimedia Subsystem (IMS) network is provided. The system includes a plurality of user terminals, at least one IMS gateway which serves one or more of the plurality of the user terminals attached thereto, and a service provider connected to the at least one IMS gateway. One of the plurality of user terminals transmits a retrieval request message to the at least one IMS gateway, receives a global ID of a counterpart terminal of the plurality of user terminals from the at least one IMS gateway in response to the retrieval request message, and establishes a service session with the counterpart terminal using the global ID for a specific service. The at least one IMS gateway forwards the retrieval request message to the service provider and the global ID to the user terminal. The service provider retrieves the global ID of the counterpart terminal and transmits the retrieved global ID to the at least one IMS gateway.

According to a further aspect of the present invention, a terminal management apparatus of a service provision system using an Internet Protocol Multimedia Subsystem (IMS) network is provided. The apparatus includes a registration processor that extracts device information from a registration request message transmitted by a user terminal and finds a global ID and user information in a global identifier (ID) registration process. The apparatus also includes an ID allocator that allocates the global ID to the user terminal using the device information provided by the registration processor. The apparatus further includes a message manager that transmits the global ID of the user terminal to the network.

BRIEF DESCRIPTION OF THE DRAWINGS

The above and other aspects, features and advantages of the present invention will be more apparent from the following detailed description when taken in conjunction with the accompanying drawings, in which:

FIG. 4 is a diagram illustrating an HTTP message format for use in a supplementary service provision method using an IMS-based network, according to an embodiment of the present invention;

FIG. 5 is a diagram illustrating how to translate an HTTP-formatted registration request message transmitted into a SIP-formatted registration request message in a supplementary service provision method for an IMS-based network, according to an embodiment of the present invention;

FIG. 6 is a diagram illustrating how to translate an HTTP-formatted service request message transmitted by a user terminal into a SIP-formatted service request message in a supplementary service provision method for an IMS-based network, according to an embodiment of the present invention;

FIG. 9 is sequence diagram illustrating operations of network entities for a service session establishment between end user terminals in a supplementary service provision method for an IMS-based network, according to an embodiment of the present invention.

DETAILED DESCRIPTION OF EMBODIMENTS OF THE PRESENT INVENTION

Embodiments of the present invention are described in detail with reference to the accompanying drawings. The same or similar reference numbers may be used throughout the drawings to refer to the same or similar parts. Detailed descriptions of constructions or processes known in the art may be omitted to avoid obscuring the subject matter of the present invention.

In the following, a description is made using terminologies defined in the $3^{rd}$ Generation Partnership Project (3GPP) specifications for asynchronous mobile communication systems and the OIPTVF specifications for IPTV systems. However, the present invention is not limited to these systems and can be applied to systems developed with similar background.

Figure 1:
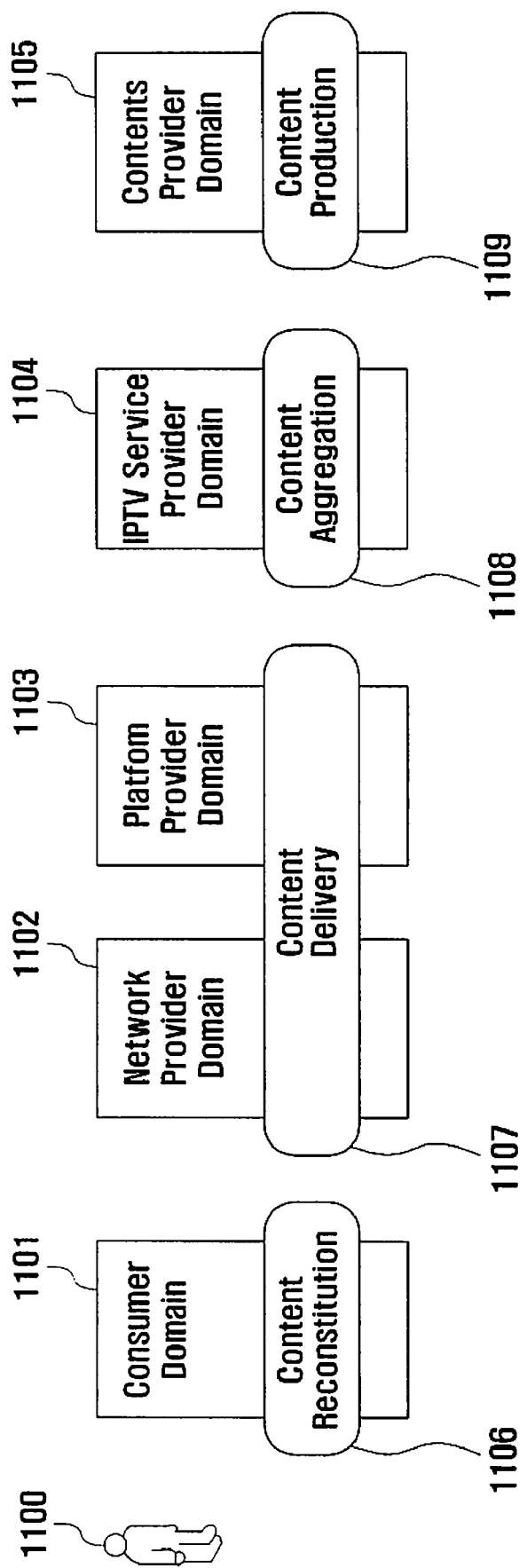
FIG. 1 is a diagram illustrating an IPTV service provision architecture including various domains within the IPTV value chain.
Figure 2:
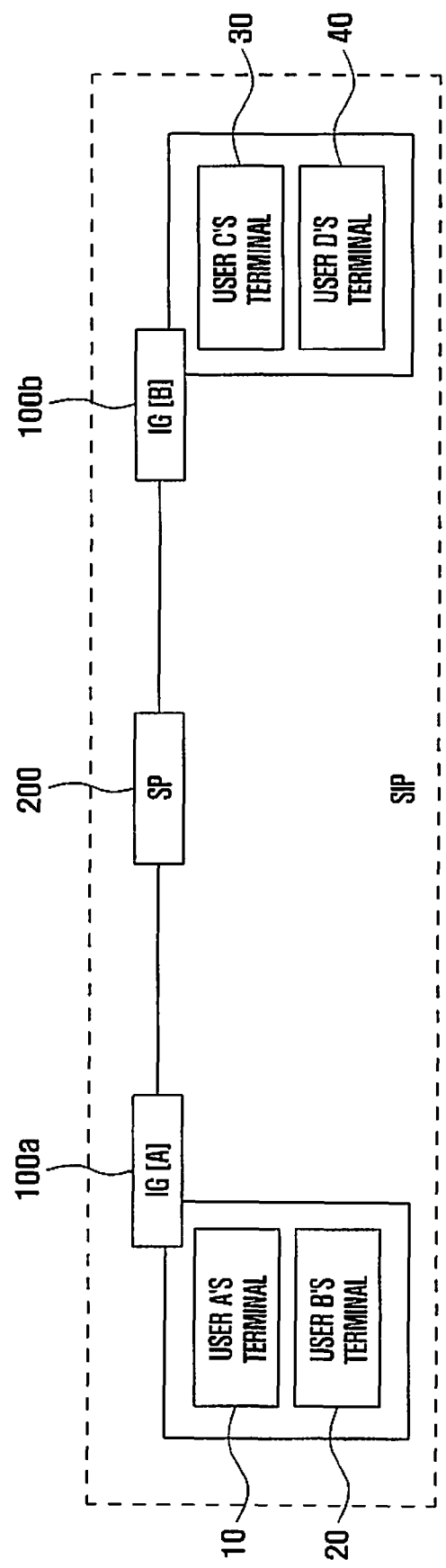
FIG. 2 is a schematic block diagram illustrating an IMS network for implementing a file sharing system, according to an embodiment of the present invention.

FIG. 2 is a schematic block diagram illustrating an IMS network for implementing a file sharing system, according to an embodiment of the present invention.

As shown in FIG. 2, the IMS network is composed of IMS Gateways IG A 100a and IG B 100b connected to a Service Provider network (SP) 200, which provides IPTV service. User A's terminal 10 and user B's terminal 20 are connected to the IG A 100a and user C's terminals 30 and user D's terminal 40 are connected to the IG B 100b. The network entities are communicating with each other by means of Session Initiation Protocol (SIP). Although not depicted in FIG. 2, the SP 200 can include an IMS network, an IPTV service provider, and a user database.

In the user's IMS registration process, the IG A 100a or IG B 100b is allocated a unique network ID, i.e., IMS Public User ID (IMPU). Since the IMPU is allocated per IG rather than per user terminal, multiple user terminals share the IMPU. The terminals cannot identify with each other on the network.

Figure 3:
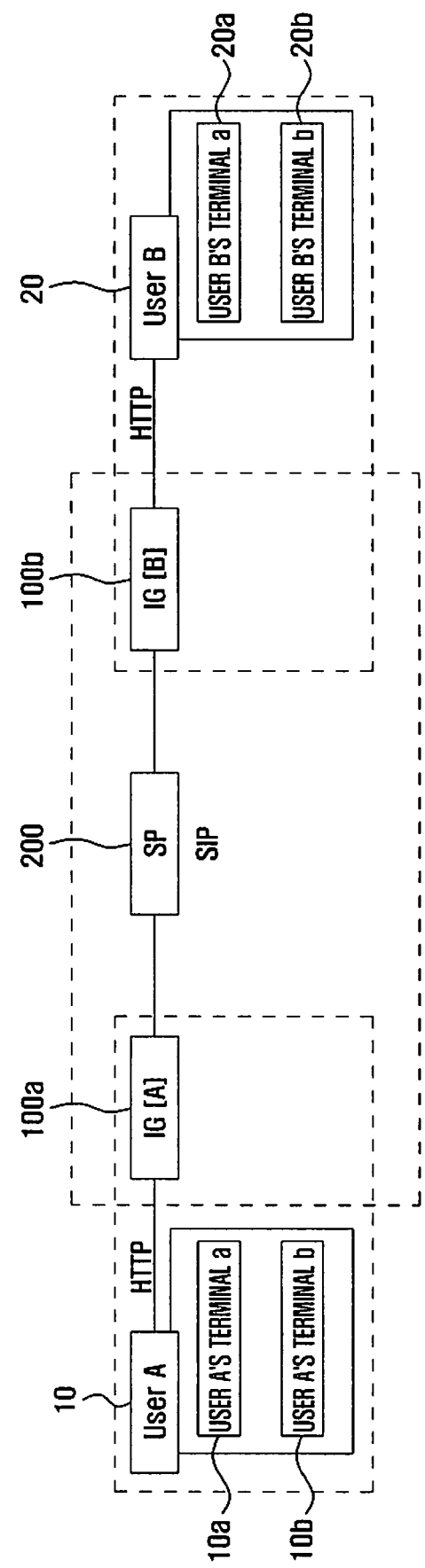
FIG. 3 is a schematic block diagram illustrating a file sharing system implemented on the IMS network, according to an embodiment of the present invention.

FIG. 3 is a schematic block diagram illustrating a file sharing system implemented on the IMS network, according to an embodiment of the present invention.

Referring to FIG. 3, the file sharing system includes the IG A 100a and the IG B 100b connected to the SP 200, which provides IPTV service. User A's 10 terminal a 10a and user A's 10 terminal b 10b are connected to the IG A 100a, and user B's 20 terminal a 20a and user B's 20 terminal b 20b are connected to the IG B 100b. The network entities are communicating with each other by means of SIP signaling. In the above structured system, the terminals 10a, 10b, 20a, and 20b can communicate with their respective IGs, 100a and 100b, by means of Hypertext Transfer Protocol (HTTP). Also, the IG A 100a and IG B 100b can communicate with the SP 200 by means of SIP signaling. Although not depicted in FIG. 3, the SP 200 can include an IMS network, an IPTV service provider, and a user database.

The user terminals 10a, 10b, 20a, and 20b are the terminals configured to receive the services provided by the SP 200 via their respective IGs, i.e., IG A 100a and IG B 100b. Each of the user terminals 10a, 10b, 20a, and 20b can be a television, a personal computer, or a mobile phone. The user terminals 10a, 10b, 20a, and 20b are allocated their respective global IDs by the IG A 100a and the IG B 100b. The global ID is an identifier for identifying a user terminal within the network and registered with the SP 200. In order for a user terminal to establish a function with another user terminal, the user terminal can send a terminal search request message to the IG 100*a* (or 100*b*).

The IG A 100*a* can allocate the global IDs to the user terminals 10*a* and 10*b* attached thereto, and the IG B 100*b* can allocate the global IDs to the user terminals 20*a* and 20*b* attached thereto. Each IG manages the global IDs allocated to the user terminals in the form of a management table so as to identify the user terminals on the network.

Although not shown in the drawing, each of the IG A 100*a* and IG B 100*b* includes a registration processor, an ID allocator, a translation processor, and a message manager.

Once a global ID registration request message has been received, the registration processor registers the global ID of the user terminal with the management table by using the per-terminal information transmitted by the terminal along with the registration request message. The registration processor binds the global ID of the user terminal with its user.

The ID allocator allocates the global ID to the user terminal.

The translation processor translates the HTTP message received from the user terminal to an SIP message or the SIP message received from the network to an HTTP message.

The message manager provides the request message to the registration processor, the ID allocator, and the translation processor and forwards the translated SIP message to the network. The message manager also forwards the message received from the network to the target user terminal attached to the IG.

In the above structured IG, the message manager receives the registration request message transmitted by a user terminal and delivers the registration request message to the registration processor. The registration processor sends the user terminal information, i.e. the device ID, carried by the registration request message to the ID allocator, and the ID allocator combines the device ID and the IMPU to generate a global ID and sends the global ID back to the registration processor. The registration processor binds the global ID with the user information and sends the binding information to the message manager. The message manager sends the binding information to the user terminal and the translation processor. The translation processor translates the binding information into the format appropriate for the SIP message and sends the translated binding information to the message manager. The message manager sends the registration request message to the network in the SIP format. The global ID allocated to each user terminal can be structured as following.

The global ID can be generated by combining the IMPU and a private IP address:
  Global ID="IMPU"+"Private IP Address"
  IMPU: user1@sii.com
  Private IP address: 192.0.0.3
  Global ID: 192.0.0.3.user1@sii.com The IMPU is the network ID allocated to the IG (IG A 100*a* or IG B 100*b*) by the IMS network. The private IP address is a local IP address allocated to the user terminal by the IG.

The global ID can be generated by combining the IMPU and a Universally Unique Identifier (UUID):
  Global ID="IMPU"+"UUID"
  IMPU: user1@sii.com
  UUID: 6d02b8ec-bd17-4156-b3d3-5369904c5fba
  Global ID: 6d02b8ec-bd17-4156-b3d3-5369904c5fba.user1@sii.com The IMPU is the network ID allocated to the IG (IG A 100*a* or IG B 100*b*) by the IMS network, and the UUID is the unique ID of the user terminal allocated at the manufacturing stage.

The IG (IG A 100*a* or IG B 100*b*) can manage the global IDs of the user terminals in the form of a management table as shown in Table 1.

TABLE 1

| User Device1 | IMPU | user1@sii.com |
|---|---|---|
| | Global ID | 192.0.0.3.user1@sii.com |
| | UUID | 6d02b8ec-bd17-4156-b3d3-5369904c5fba |
| | IP address | 192.0.0.3 |
| | Description Information | Resolution: 1280 × 960, HD Storage support: Yes Audio: 2 Channel Bandwidth: VDSL etc. |
| Device2 | Global ID | notePC.user1@sii.com |
| ... | ... | ... |

In Table 1, the "description" is the information entered by the user to provide the counterpart user terminal with the information about the user terminal. The "information" is the capability information, such as display resolution and functions supported by the user terminal.

The management table is stored in the IG (IG A 100*a* or IG B 100*b*) and can be transmitted to the SP 200 in an eXtensible Markup Language (XML) format. The SP 200 can store the management table transmitted by the IGs (IG A 100*a* and IG B 100*b*) in a user database. The management tables stored in the SP 200 can be provided to the users attempting to use the file sharing service or communication service.

A description is provided below in which the IG (IG A 100*a* or IG B 100*b*) registers the global ID of a user terminal with the SP 200 in which the user terminal 10*a* owned by the user A 10 is registered with the SP 200.

The user terminal 10*a* transmits a registration request message to the IG A 100*a* in response to a user command. The registration request message is transmitted in HTTP format and includes terminal information about the user terminal 10*a*. The terminal information includes the IP address, capability, supportable functions, etc.

If the registration request message transmitted by the user terminal a 10*a* has been received, the IG A 100*a* allocates a global ID to the user terminal a 10*a*. The global ID can be generated by combining the IMPU of the IG a 100*a* and the private IP address of the user terminal 10*a*, or by combining the IMPU of the IG A 100*a* and the UUID of the user terminal 10*a*. After allocating the global ID to the user terminal a 10*a*, the IG A 100*a* transmits the global ID and terminal information of the user terminal 10*a* to the SP 200. The SP 200 stores the global ID of the user terminal 10*a* in the user database. The IG A 100*a* transmits the global IDs of the user terminals to the SP 200 in SIM message format.

A description is provided below in which the user A 10 requests a search for a user terminal owned by the user B 20.

The user terminal 10*a* of the user A 10 transmits a search request message to the IG A 100*a* in search of a terminal owned by the user B 20 (hereinafter called the counterpart terminal). The search request message is transmitted in HTTP message format. If the search request message has been received, the IG A 100*a* translates the search request message into the SIP message format, and transmits the translated search request message to the SP 200. If the search request message has been received, the SP 200 searches the user database for the global ID and terminal information of the counterpart terminal indicated by referencing the search request message. If the global ID and terminal information of the counterpart terminal has been found, the SP 200 transmits a search response message (SIP format) containing the found global ID and terminal information to the IG A 100a. The IG A 100a translates the search response message into the HTTP message format and transmits the translated search response message to the user terminal 10a. Upon receipt of the search response message, the user terminal 10a establishes a connection with the counterpart terminal for file sharing or communication.

As described above, in an embodiment of the present invention, the IG (IG A 100a or IG B 100b) allocates the global IDs to the user terminals attached thereto, and the user terminals share files or communicate with each other.

A description is provide below of the HTTP format of the messages exchanged between the user terminal and the IG.

FIG. 4 is a diagram illustrating an HTTP message format for use in a supplementary service provision method using an IMS-based network, according to an embodiment of the present invention.

As shown in FIG. 4, the HTTP message is composed of an HTTP header and an HTTP body. The HTTP header is maintained, and the HTTP body includes information such as registration request/response (REQ/RSP), and user information retrieval REQ/RSP. REQ stands for any request indicating that the HTTP message is a request message transmitted from a user terminal to the IG. RSP stands for any response indicating that the HTTP message is a response message transmitted from the IG to the user terminal.

Table 2 shows the detailed information in the body of the HTTP message.

TABLE 2

| Message Name | Parameters | Description |
|---|---|---|
| Registration REQ | IMPU of user terminal requesting registration<br>Device Private IP address<br>Device UUID | Request global ID<br>Request registration of terminal information including Global ID with SP |
| Registration RSP | IMPU<br>Device Private IP address<br>Device UUID<br>Global ID of Device<br>Registration Report | Notify user terminal of registration complete<br>Carry global ID allocation information |
| User info. Retrieval REQ | IMPU of counterpart terminal | |
| User info. Retrieval RSP | IMPU of user terminal requesting search<br>IMPU of counterpart terminal<br>device information of counterpart terminal | Acquire terminal information of counterpart terminal |
| Service REQ | IMPU of counterpart terminal<br>IMPU of user terminal requesting service<br>Global ID of user terminal requesting service<br>Global ID of counterpart terminal<br>Service type | Request the counterpart terminal for selected service |
| Service RSP | IMPU of counterpart terminal<br>IMPU of user terminal requesting service<br>Global ID of counterpart terminal<br>Global ID of user terminal requesting service<br>Service type<br>Service Response | Reply in response to service request |

In Table 2, the "service type" indicates the type of the service intended between the user terminal and the counterpart terminal, such as communication service, file sharing service, and file transfer service.

A description is made of the translation between the HTTP message and the SIP message with reference to FIGS. 5 and 6.

FIG. 5 is a diagram illustrating how to translate an HTTP-formatted registration request message transmitted into a SIP-formatted registration request message in a supplementary service provision method for an IMS-based network, according to an embodiment of the present invention.

Referring to FIG. 5, the IG translates the HTTP-formatted registration request message transmitted by the user terminal into the SIP-formatted registration request message. The information contained in the HTTP-formatted registration request message is translated into the format appropriate for the SIP message as described in Table 3.

TABLE 3

| | SIP | |
|---|---|---|
| HTTP Body | Header | Body (XML) |
| Message name:<br>Registration REQ | Method: MESSAGE<br>Content type: text/plain<br>To:<br>sip:<br>IPTVapp@domain.com | Message type:<br>Registration REQ |
| IMPU: user A<br>Device Private IP address: 192.1.1.3<br>UUID | | Device Global ID:<br>User terminal A<br>device information of user terminal A |

Referring to Table 3, if the message name field of the body of the HTTP message transmitted by the user terminal is set to Registration REQ, the IG sets the method field of the SIP message to MESSAGE and the content type field of the SIP message to text/plain. The IG sets the destination of the SIP message to the SP's address, e.g. IPTVapp@domain.com. The IG sets the message type field in the body of SIP message to Registration REQ to trigger an action of the SP in response to message type. The IMPU and Device Private IP address in the HTTP body are the information required for the IG to allocate a global ID to the user terminal.

The global ID allocated to the user terminal by the IG is relayed to the SP in the device global ID field of the SIP body. The UUID contained in the HTTP message is used for mapping the device information to the global ID of the user terminal.

A description is provided below of the translation of the HTTP messages exchanged between user terminals for a specific service to the corresponding SIP messages with reference to FIG. 6.

FIG. 6 is a diagram illustrating how to translate an HTTP-formatted service request message transmitted by a user terminal into an SIP-formatted service request message in a supplementary service provision method for an IMS-based network, according to an embodiment of the present invention.

Referring to FIG. 6, if an HTTP-formatted service request message has been received from the user terminal, the IG extracts the information required for generating a SIP message from the header and body of the HTTP-formatted service request message. The IG converts the HTTP-formatted service request message to the SIP-formatted service request message using the extracted information. The HTTP-formatted service request message is converted into the format appropriate for the SIP message as described in Table 4.

TABLE 4

| HTTP Body | SIP | |
| --- | --- | --- |
| | Header | Body (SDP) |
| Message name: Service REQ service type: file Share source device IMPU: user A destination device IMPU: user B source device global ID: user terminal a destination device global ID: user terminal b | Method: INVITE Content type: Application/SDP From: sip: userA@domain.com To: sip: userB@domain.com | s: Service REQ i: File Share User terminal a, Counterpart terminal b m: File 2232 http 31 |

If the message name field of the body of the HTTP message transmitted by the user terminal is set to Service REQ, the IG sets the method field of the SIP message header to INVITE and the content type field of the SIM message header to Application/SDP. The IG sets the "From" and "To" fields of the SIM message header to userA@domain.com and userB@domain.com by referencing the user terminal's IMPU, counterpart terminal's IMPU, user terminal's global ID, and counterpart terminal's global ID. The IG inserts the information related to the requested service into the body of the SIP message such that the IG of the counterpart terminal requests the counterpart terminal for the service based on the information. Specifically, the IG sets the "s" field (i.e., session name) to Service Request and the "I" field (i.e., session information) to the information in order of service type (file share), service requesting terminal (user terminal a), and service requested terminal (user terminal b). The IG also sets the "m" field (i.e., media information) to file transfer using http. The IG can set other parameters required for the SIP message in addition to the parameters shown in Table 4.

A description is provided below of a procedure for the IG to register the user terminal with the SP with reference to FIG. 7.

Figure 7:
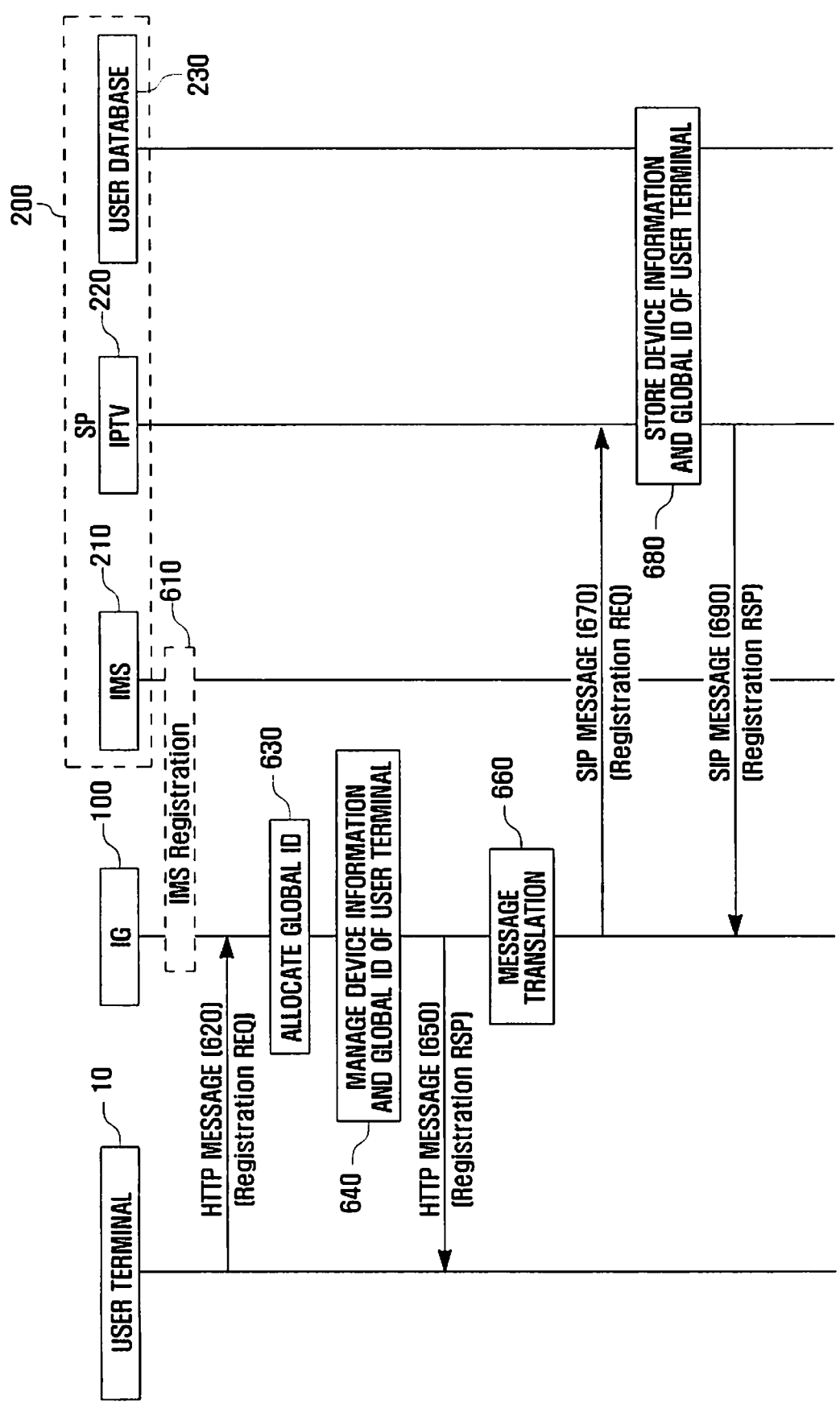
FIG. 7 is a sequence diagram illustrating operations of network entities for terminal registration in a supplementary service provision method for an IMS-based network, according to an embodiment of the present invention.

FIG. 7 is a sequence diagram illustrating operations of network entities for terminal registration in a supplementary service provision method for an IMS-based network, according to an embodiment of the present invention.

Referring to FIG. 7, an IG 100 registers with an IMS network 210 and is allocated a unique network ID, i.e., IMPU, by the IMS network 210 in step 610. The user terminal 10 transmits an HTTP-formatted registration REQ message to the IG 100 in step 620. The registration REQ message includes the information related to the user terminal 10, such as IP address and UUID.

Upon receipt of the HTTP-formatted registration REQ message, the IG 100 allocates a global ID to the user terminal 10 in step 630. The global ID is generated by combining the IMPU of the IG 100 and the private IP address of the user terminal 10, or by combining the IMPU of the IG 100 and the UUID of the user terminal 10. The IG 100 updates a global ID management table with the global ID and the device information of the user terminal 10 in step 640. The IG 100 transmits an HTTP-formatted registration RSP message to the user terminal 10 in response to the HTTP-formatted registration REQ message in step 650.

After transmitting the HTTP-formatted registration RSP message, the IG 100 converts the HTTP-formatted registration REQ message to a SIP-formatted Registration REQ message in step 660. The SIP-formatted registration REQ message includes the device information and global ID of the user terminal 10. The IG 100 transmits the SIP-formatted registration REQ message to an IPTV 220 of the SP 200 through the IMS network in step 670.

The IPTV 220 extracts the device information and global ID of the user terminal 10 from the SIP-formatted registration REQ message and stores the device information and global ID of the user terminal 10 in a user database 230 of the SP 200 in step 680. The IPTV 220 transmits an SIP-formatted registration RSP to the IG 100 through the IMS network 210 in step 690.

A description is provided below of the registered user terminal search procedure with reference to FIG. 8.

Figure 8:
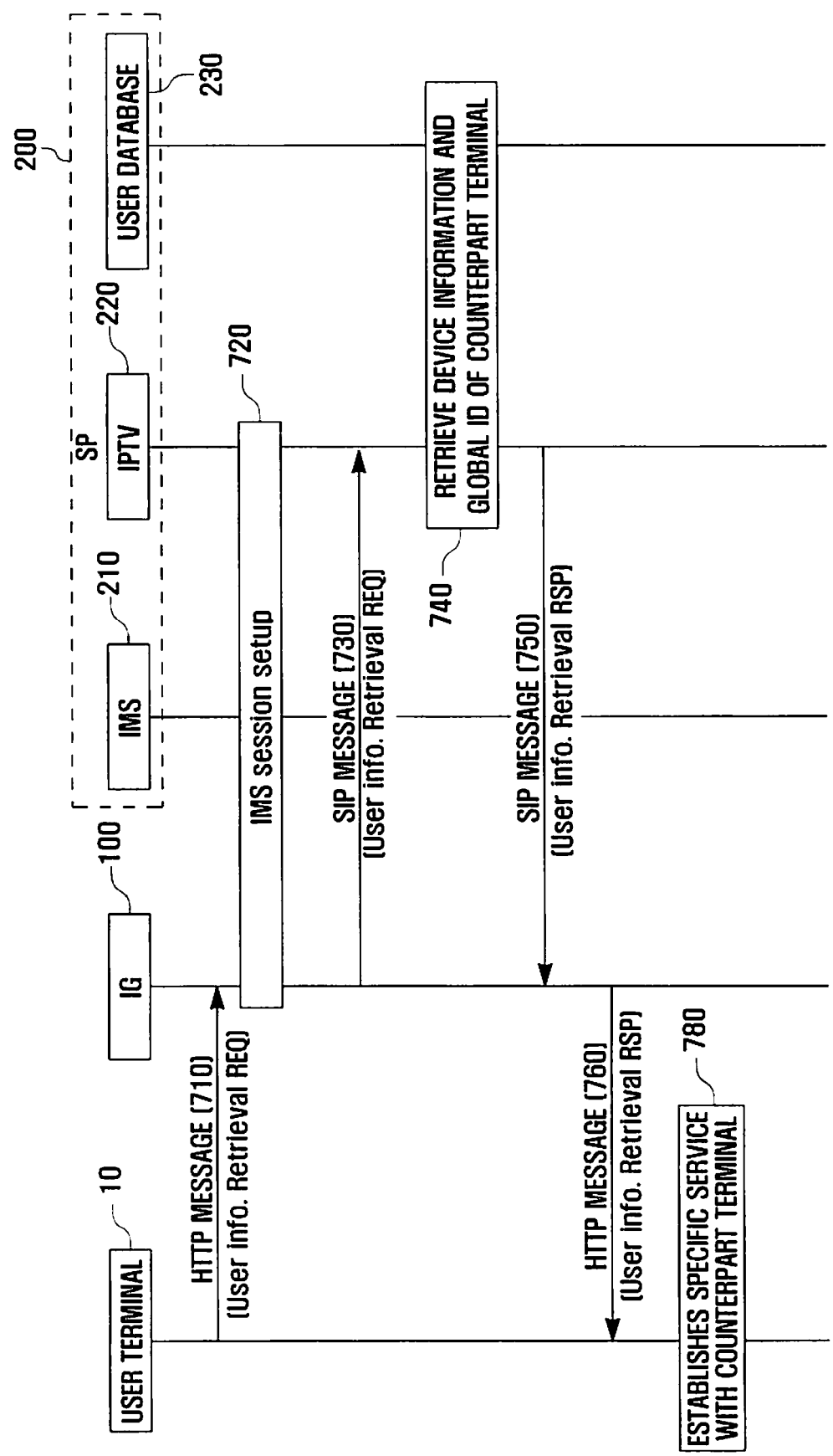
FIG. 8 is a sequence diagram illustrating operations of network entities for terminal retrieval in a supplementary service provision method for an IMS-based network, according to an embodiment of the present invention.

FIG. 8 is a sequence diagram illustrating operations of network entities for terminal retrieval in a supplementary service provision method for an IMS-based network, according to an embodiment of the present invention.

Referring to FIG. 8, the user A wants to establish a file sharing session of the user A's terminal 10 with the user B's terminal (hereinafter called counterpart terminal). The user terminal 10 transmits an HTTP-formatted user information retrieval REQ message to the IG 100 in response to a user command in step 710. The user information retrieval REQ message includes the IMPU of the counterpart terminal.

If the user information retrieval REQ message has been received, the IG 100 establishes an IMS session with the IPTV 220 of the SP 200 via the IMS network 210 in step 720. Once the IMS session has been established, the IG 100 converts the HTTP-formatted user information retrieval REQ message to the SIP-formatted user information retrieval REQ message. The IG 100 transmits the SIP-formatted user information retrieval REQ message to the IPTV 220 via the IMS network 210 in step 730.

If the SIP-formatted user information retrieval REQ message has been received, the IPTV SP searches the user database 230 for the device information and global ID of the counterpart terminal indicated by the SIP-formatted user information retrieval REQ message in step 740. Specifically, the IPTV 220 checks the counterpart terminal's IMPU contained in the SIP-formatted user information retrieval REQ message and retrieves the device information and global ID of at least one counterpart terminal that are mapped to the IMPU from the user database 230. The IPTV 220 can notify the counterpart terminal of the information retrieval request from the user terminal 10 and be granted permission.

The IPTV 220 transmits the SIP-formatted user information retrieval RSP message to the IG 100 via the IMS network 210 in response to the SIP-formatted user information retrieval REQ message in step 750. The user information retrieval RSP message includes the device information and global ID of the at least one retrieved counterpart terminal. Upon receipt of the SIP-formatted user information retrieval RSP message, the IG 100 converts the SIP-formatted user information retrieval RSP message to the HTTP-formatted user information retrieval RSP message and transmits the HTTP-formatted user information retrieval RSP message to the user terminal 10 in step 760.

Upon receipt of the HTTP-formatted user information retrieval RSP message, the user terminal 10 establishes a specific function with the counterpart terminal using the device information and global ID of the at least one counterpart terminal in step 780. Specifically, the user terminal 10 checks the device information and global ID of the at least one counterpart user's terminal and displays the device information and global ID on the screen such that the user can select one of the at least one counterpart user's terminals while viewing the displayed device information and global ID. If one of the at least one counterpart user's terminals has been selected by the user, the user terminal 10 establishes a specific function with the selected counterpart user's terminal.

The target user terminal information acquisition procedure has been described above. A description is provided below of the function execution in the session established between the end user terminals with reference to FIG. 9.

FIG. 9 is sequence diagram illustrating operations of network entities for a service session establishment between end user terminals in a supplementary service provision method for an IMS-based network, according to an embodiment of the present invention. In FIG. 5, the terminal inviting another terminal for a specific service is referred to as the user terminal, and the terminal invited for the specific service is referred to as the counterpart terminal.

Referring to FIG. 9, the user terminal 10a transmits an HTTP-formatted Service REQ message to the IG A 100a to request the IG A 100a for a service in step 810. The service can be any of a file sharing service, a communication service, and a file transfer service.

If the HTTP-formatted service REQ message has been received, the IG A 100a converts the HTTP-formatted service REQ message into an SIP-formatted service REQ message in step 815, and transmits the SIP-formatted service REQ message to the IG B 100b via the SP 200 in step 820. The counterpart terminal 20b is attached to the IG B 100b. If the SIP-formatted service REQ message has been received, the IG B 100b converts the SIP-formatted service REQ message into the HTTP-formatted service REQ message in step 825.

The IG B 100b transmits the HTTP-formatted service REQ message to the counterpart terminal 20b in step 830. If the HTTP-formatted service REQ message has been received, the counterpart terminal 20b transmits an HTTP-formatted service RSP message to the IG B 100b according to a user command in step 835. If the HTTP-formatted service RSP message has been received, the IG B 100b converts the HTTP-formatted service RSP message to an SIP-formatted service RSP message in step 840 and transmits the SIP-formatted Service RSP message to the IG A 100a via the SP 200 in step 845. If the SIP-formatted service RSP message has been received, the IG A 100a converts the SIP-formatted service RSP message to an HTTP-formatted service RSP message in step 850, and transmits the HTTP-formatted service RSP message to the user terminal 10a in step 855.

The user terminal 10a checks the HTTP-formatted service RSP message and the service session is established between the user terminal 10a and the counterpart terminal 20b in step 860. There are multiple communication sessions established while exchanging the service request and response messages between the user terminal 10a and the counterpart terminal 20b: an HTTP session between the user terminal 10a and the IG A 100a, an SIP session between the IG A 100a and IG B 100b, and an HTTP session between the IG B 100b and the counterpart terminal 20b. These sessions establish a service link between the user terminal 10a and the counterpart terminal 20b such that the two end user terminals 10a and 20b can use a specific service such as file sharing.

As described above, the supplementary service provision method and system for an IMS-based network according to embodiments of the present invention is capable of allocating unique IDs to the end user terminals served by a service provider and registering the unique terminal IDs with the service provider. The service provider can provide the end user terminals with various services (such as, file sharing services and communication services) using the registered IDs. Accordingly, a supplementary service provision method and a system for an IMS-based network according to embodiments of the present invention enhance the usability of the IPTV service network for subscribers and creates supplementary profit sources for the service provider.

While the invention has been shown and described with reference to certain embodiments thereof, it will be understood by those skilled in the art that various changes in form and detail may be made therein without departing from the spirit and scope of the present invention, as defined in the appended claims.

What is claimed is:

1. A service provision method in an Internet Protocol Multimedia Subsystem (IMS) network, comprising the steps of:
   transmitting a service request message from a first user terminal to a second user terminal for requesting a service, wherein the service request message comprises global IDentifiers (IDs) allocated to the first user terminal and the second user terminal;
   transmitting a service response message from the second user terminal to the user first terminal; and
   establishing a service session between the first user terminal and the second user terminal, when the service response message is received by the first user terminal,
   wherein the global IDs are generated by concatenating a network ID allocated to an IMS gateway by the IMS network, to a unique user terminal ID.

2. The service provision method of claim 1, further comprising:
   transmitting a retrieval request message from the first user terminal to a service provider via an IMS gateway to which the first user terminal is attached;
   retrieving, at the service provider, at least one global ID matched to the retrieval request message; and
   transmitting a retrieval response message comprising the retrieved global ID from the service provider to the first user terminal via the IMS gateway.

3. The service provision method of claim 2, further comprising:
   transmitting a registration request message from the first user terminal to the IMS gateway;
   allocating the global ID to the first user terminal by the IMS gateway; transmitting the registration request message containing the global ID and device information of the first user terminal from the IMS gateway to the service provider; and
   storing, at the service provider, the global ID and the device information of the first terminal.

4. The service provision method of claim 1, wherein the unique terminal ID includes a private IP address allocated to a respective user terminal.

5. The service provision method of claim 1, wherein the unique terminal ID includes a unique device ID allocated to a respective user terminal.

6. The service provision method of claim 3, wherein transmitting the registration request message comprises:
   converting the registration request message into Session Initiation Protocol (SIP) format; and
   transmitting the SIP-formatted registration request message to the service provider.

7. The service provision method of claim 1, wherein the service comprises at least one of a file sharing service, a communication service, and a file transfer service.

8. A service provision system using an Internet Protocol Multimedia Subsystem (IMS) network, comprising:
   a plurality of user terminals; at least one IMS gateway that serves one or more of the plurality user terminals attached thereto; and
   a service provider connected to the at least one IMS gateway;

wherein one of the plurality of user terminals transmits a retrieval request message to the at least one IMS gateway, receives a global IDentifier (ID) of a counterpart terminal of the plurality of user terminals from the IMS gateway in response to the retrieval request message, and establishes a service session with the counterpart terminal using the global ID for a specific service;

wherein the at least one IMS gateway forwards the retrieval request message to the service provider and the global ID to the user terminal; and wherein the service provider retrieves the global ID of the counterpart terminal and transmits the retrieved global ID to the at least one IMS gateway, wherein the global ID is generated by concatenating a network ID allocated to an IMS gateway by the IMS network, to a unique user terminal ID.

9. The service provision system of claim 8, wherein the user terminal transmits a registration request message in Hypertext Transfer Protocol (HTTP) format to the at least one IMS gateway, the at least one IMS gateway allocates a global identifier (ID) to the user terminal upon receipt of the HTTP-formatted registration request message and transmits the global ID to the service provider, and the service provider stores the global ID received from the at least one IMS gateway.

10. The service provision system of claim 9, wherein the at least one IMS gateway comprises a management table for managing the global ID allocated to the user terminal.

11. A terminal management apparatus of a service provision system using an Internet Protocol Multimedia Subsystem (IMS) network, comprising:

a registration processor that extracts device information from a registration request message transmitted by a user terminal and finds a global IDentifier (ID) and user information in a global ID registration process;

an ID allocator that allocates the global ID to the user terminal using the device information provided by the registration processor; and a message manager that transmits the global ID of the user terminal to the network wherein the global ID is generated by concatenating a network ID allocated to an IMS gateway by the IMS network, to a unique user terminal ID.

12. The terminal management apparatus of claim 11, further comprising a translation processor that translates the registration request message transmitted by the user terminal into a Session Initiation Protocol (SIP) message.

* * * * *